(12) United States Patent
Van Hattem

(10) Patent No.: US 10,863,855 B2
(45) Date of Patent: Dec. 15, 2020

(54) CENTRIFUGAL DEVICE FOR BREWING COFFEE

(71) Applicant: Spinn Holding B.V., Amsterdam (NL)

(72) Inventor: Jan Cornelis Van Hattem, Amerongen (NL)

(73) Assignee: Spinn Holding B.V., Amsterdam (NL)

( * ) Notice: Subject to any disclaimer, the term of this patent is extended or adjusted under 35 U.S.C. 154(b) by 317 days.

(21) Appl. No.: 15/742,920

(22) PCT Filed: Jul. 11, 2016

(86) PCT No.: PCT/NL2016/050513
§ 371 (c)(1),
(2) Date: Jan. 9, 2018

(87) PCT Pub. No.: WO2017/010878
PCT Pub. Date: Jan. 19, 2017

(65) Prior Publication Data
US 2018/0368608 A1    Dec. 27, 2018

(30) Foreign Application Priority Data

Jul. 10, 2015 (NL) .................................... 2015147

(51) Int. Cl.
*A47J 31/22* (2006.01)
*A47J 31/20* (2006.01)

(52) U.S. Cl.
CPC ............... *A47J 31/22* (2013.01); *A47J 31/20* (2013.01)

(58) Field of Classification Search
CPC .................................. A47J 31/22; A47J 31/20
See application file for complete search history.

(56) References Cited

U.S. PATENT DOCUMENTS

| | | | |
|---|---|---|---|
| 3,455,230 A * | 7/1969 | Beniamino | A47J 31/22 99/287 |
| 4,074,621 A | 2/1978 | Cailliot | |
| 4,641,572 A * | 2/1987 | Varga | A47J 31/22 99/286 |

(Continued)

FOREIGN PATENT DOCUMENTS

| | | | |
|---|---|---|---|
| EP | 1876934 B1 | 1/2008 | |
| NL | 1000655 C2 * | 12/1996 | .............. A47J 31/22 |

(Continued)

*Primary Examiner* — Jacob J Cigna

(74) *Attorney, Agent, or Firm* — Hoffmann & Baron, LLP

(57) ABSTRACT

A centrifugal device for brewing coffee includes a spinning assembly, the spinning assembly includes a piston element, a cylinder element including a peripheral wall, a filter, a motor and a spindle connected to the motor. The piston element includes a nut. During centrifugal rotation, the piston element is in a coffee brewing position, and during the centrifugal rotation the piston element is rotated by the spindle via the action on the nut and is pressed against the upper rim, where a centrifugal force is created which forms a bed of coffee against the peripheral wall and which drives hot water through the bed of coffee and through the filter. A stopping device includes an engagement member and an actuator, the engagement member being movable by the actuator between an engaged position engaging the piston element of the spinning assembly and a disengaged position.

16 Claims, 14 Drawing Sheets

(56) References Cited

U.S. PATENT DOCUMENTS

| | | | | |
|---|---|---|---|---|
| 8,039,033 B2 * | 10/2011 | Van Hattem | ............ | A47J 31/22 426/433 |
| 9,021,938 B2 * | 5/2015 | Duvall | .................... | A47J 31/22 99/289 R |
| 2010/0018405 A1 * | 1/2010 | Duvall | ................ | A47J 31/0647 99/289 R |
| 2010/0266739 A1 * | 10/2010 | van Hattem | ............ | A47J 31/22 426/433 |
| 2019/0365138 A1 * | 12/2019 | Yeung | ..................... | A47J 31/20 |

FOREIGN PATENT DOCUMENTS

| | | | | |
|---|---|---|---|---|
| WO | 2006/112691 A1 | 10/2006 | | |
| WO | 2012/069986 A1 | 5/2012 | | |
| WO | WO-2012069986 A1 * | 5/2012 | .............. | A47J 31/22 |
| WO | 2014/096122 A1 | 6/2014 | | |

* cited by examiner

CENTRIFUGAL DEVICE FOR BREWING COFFEE

CROSS-REFERENCE TO RELATED APPLICATIONS

This application is the National Stage of International Application No. PCT/NL2016/050513, filed Jul. 11, 2016, which claims the benefit of Netherlands Application No. NL 2015147, filed Jul. 10, 2015, the contents of which is incorporated by reference herein.

FIELD OF THE INVENTION

The present invention relates to a centrifugal device for brewing coffee and a corresponding method. The device is based on spinning a spinning assembly at high speed, thereby creating a centrifugal force which forces water through a bed of coffee and through a filter.

BACKGROUND OF THE INVENTION

EP1876934B1 discloses a centrifugal device for brewing coffee according to the prior art. Reference is made to FIG. 15. The device comprises a screw spindle having a groove. The spindle is driven by motor. The device further comprises a piston element which comprises a nut.

After the centrifuging of the coffee has completed, the waste material of the coffee has to be removed from the chamber. To this end, the motor and the spindle make an abrupt stop. The piston element, as a result of its inertia, will continue to rotate and make a helical upward movement along the groove. During its upward movement, it will wipe the coffee from the filter screen. When the piston element is in the upper position, the motor and the spindle will start to spin in the opposite direction and the coffee is ejected sideways from the bottom plate of the piston element.

After the ejection of the coffee, the motor and the spindle are reversed abruptly again, and the piston element will return back to the lower position due to its own inertia by a reverse helical movement along the groove.

It was recognized in the present invention that this upward and downward movement is not reliable and may lead to errors.

OBJECT OF THE INVENTION

It is an object of the invention to provide a centrifugal device for brewing coffee having a spinning assembly which moves between a centrifuge position and a coffee ejection position in a more reliable manner.

It is an object of the invention to provide a centrifugal device for brewing coffee which is an alternative to the prior art.

SUMMARY OF THE INVENTION

In order to achieve at least one object, the invention provides a centrifugal device for brewing coffee, comprising:
a spinning assembly which defines a brewing chamber into which ground coffee and hot water are supplied, the spinning assembly being constructed to rotate about a central axis, the spinning assembly comprising:
a piston element comprising a bottom wall and a top wall part,
a cylinder element comprising a peripheral wall which comprises a filter,
wherein the cylinder element comprises an upper rim, and wherein the top wall part of the piston element is configured to engage the upper rim,
wherein the peripheral wall and the bottom wall define the brewing chamber,
a motor and a spindle connected to the motor, the spindle being coaxial with the central axis and comprising a helical cam track,
wherein the piston element comprises a nut which runs along the helical cam track, wherein during a centrifugal rotation the piston element is in a coffee brewing position in which the top wall part of the piston element is pressed against the upper rim of the cylinder element by the helical cam track which acts on the nut, and wherein during said centrifugal rotation the piston element is rotated by the spindle via the action on the nut and is pressed against the upper rim, causing the cylinder element to be rotated together with the piston element, wherein a centrifugal force is created which forms a bed of coffee against the peripheral wall and which drives the hot water through the bed of coffee and through the filter,
wherein the cylinder element is rotatable relative to the spindle when the piston element is not in the brewing position,
wherein the centrifugal device further comprises a stopping device comprising:
an engagement member and
an actuator,
the engagement member being movable by the actuator between an engaged position and a disengaged position, wherein in the engaged position the engagement member engages the piston element and stops a rotation of said piston element, thereby causing the nut to travel along the helical cam track of the spindle when the spindle is rotated by the motor and causing the piston element to move upward or downward relative to the cylinder element between the coffee brewing position in which the coffee is brewed and a coffee ejecting position in which used ground coffee is ejected.

With the present invention the movement of the piston element between the coffee brewing position and the coffee ejecting position can be controlled in a more reliable manner. Instead of using the inertia of the piston element as is proposed in the prior part, the stopping device allows a better and more reliable manner of moving the piston element up and down.

In an embodiment, the engagement member is configured to engage the piston element both in the coffee brewing position and in the coffee ejecting position of the piston element and is configured to disengage the piston element both in the coffee brewing position and in the coffee ejecting position, thereby defining four operating situations:
an engaged position when the piston element is in the coffee brewing position,
a disengaged position when the piston element is in the coffee brewing position,
an engaged position when the piston element is in the coffee ejecting position, and
a disengaged position when the piston element is in the coffee ejecting position.

In an embodiment, the piston element comprises a number of protrusions which protrude from the piston element, wherein the engagement member is configured to be moved into the path of the protrusions in the engaged position for engaging the protrusions, thereby stopping the rotation of the piston element. It was found that this is a simple way of stopping the piston element from rotating.

In an embodiment, the engagement member is moved in a horizontal direction between the engaged position and the non-engaged position.

In an embodiment, the engagement member extends over a vertical distance which is at least equal to the distance between the coffee brewing position and the coffee ejecting position of the piston element and wherein the engagement member comprises a first engagement area and a second engagement area which are spaced apart, and wherein the engagement member contacts the piston element with the first engagement area when it is in the coffee brewing position and with the second engagement area when it is in the coffee ejecting position.

In an embodiment, the actuator is separate from the motor and independently operable from the motor.

In an embodiment, the helical cam track has an ejecting end, wherein in the coffee ejecting position the nut is located at the ejecting end of the helical cam track and is driven by the ejecting end during the spinning at high speed in which the used coffee is ejected.

In an embodiment, the coffee brewing position is a lower position and the coffee ejecting position is an upper position.

In an embodiment, in the coffee ejecting position the bottom wall is located above the upper rim of the peripheral wall.

In an embodiment, the actuator of the stopping device is positioned above the brewing chamber and the motor is positioned above the brewing chamber, and wherein the engagement member extends downwards from the actuator.

In an embodiment, the centrifugal device comprises:
  a revolution sensor coupled to the motor or to the spindle, the revolution sensor being configured to record the revolutions of the motor or spindle, and
  a control unit coupled to the sensor and coupled to the stopping device, the control unit being configured to:
    count a number of revolutions of the spindle from a moment in which the engagement member engages the piston element in the coffee brewing position, and to send a disengagement signal to the stopping device for disengaging the engagement member from the piston element after a predetermined number of revolutions of the motor or spindle, which predetermined number of revolutions determines when the piston element reaches the coffee ejecting position, and/or
    count a number of revolutions of the spindle from a moment in which the engagement member engages the piston element in the coffee ejecting position, and to send a disengagement signal to the stopping device for disengaging the engagement member from the piston after a predetermined number of revolutions of the motor or spindle which defines the moment at which the piston element reaches the coffee brewing position.

The present invention further relates to a method of brewing coffee, the method comprising:
  supplying ground coffee and hot water into the brewing chamber of the centrifugal device according to the invention,
  spinning the spinning assembly at a high rotational speed in a brewing stage, wherein a centrifugal force is created, wherein the centrifugal force forms a bed of coffee against the peripheral wall and drives the hot water through the coffee and through the filter,
  after the coffee has been prepared:
    stopping the motor and engaging the engagement member against the piston element,
    rotating the spindle in the opposite direction, thereby forcing the piston element to move along the helical cam track relative to the cylinder part from the coffee brewing position to the coffee ejecting position while wiping the used coffee from the peripheral wall,
    after the piston element has reached the coffee ejecting position, disengaging the engagement member from the piston element and spinning the piston element at a high rotational speed in an ejection stage, thereby ejecting the coffee sideways from the piston element by centrifugal force,
    after the coffee had been ejected, re-engaging the engagement member against the spinning assembly and again reversing the direction of rotation of the spindle, thereby forcing the piston element to return along the helical cam track from the coffee ejecting position to the coffee brewing position until the top wall part engages the upper rim of the cylinder element and the piston element has returned to the coffee brewing position,
    after the piston element has reached the coffee brewing position, disengaging the engagement member from the spinning assembly.

The method has the same advantages as the centrifugal device according to the invention.

In an embodiment of the method, the motor is rotated at a high speed during the brewing stage and the ejection stage and the piston element is rotated at a relatively low speed during the movement of the piston element between the coffee brewing position and the coffee ejecting position.

In an embodiment, the method comprises:
  counting the number of revolutions during a movement of the piston element between the coffee brewing position and the coffee ejecting position, and
  determining when the piston element has travelled the full distance between the coffee brewing position and the coffee ejecting position on the basis of the counted revolutions, and
  disengaging the stopping device from the piston element when the piston element has reached the coffee brewing position or the coffee ejecting position.

In an embodiment, during the brewing stage the piston element is driven by the spindle which acts on the nut, the piston element being pressed against the upper rim of the cylinder element and taking the cylinder element with it in the centrifugal rotation.

In an embodiment, during the ejection stage the nut is located at an ejection end of the helical cam track and is driven by the spindle which acts on the nut of the piston element via the ejection end of the helical cam track.

A second invention provides a centrifugal device for brewing coffee, comprising:
  a spinning assembly which defines a brewing chamber into which ground coffee and hot water are supplied, the spinning assembly being constructed to rotate about a central axis, the spinning assembly including the brewing chamber being coaxial with the central axis, the spinning assembly comprising:
    a piston element comprising a bottom wall which forms a bottom of the brewing chamber and a cylinder element comprising a peripheral wall which comprises a filter via which the brewed coffee exits the chamber, a motor constructed for spinning the spinning assembly in a brewing stage in order to create a centrifugal force which drives hot water through a bed of ground coffee and through the filter, a control unit for controlling the motor, wherein the control unit is configured to:

fill the brewing chamber with ground coffee and hot water, and prior to the brewing stage, let the motor rotate the spinning assembly which contains ground coffee and hot water at a low speed during a first time period in a stirring stage, thereby stirring the mixture of ground coffee and hot water in the brewing chamber at the low speed, during the brewing stage, spinning the spinning assembly at a high speed in order to force the water through the bed of ground coffee and through a filter.

The second invention forms an improvement over the prior art according to EP1876934B1 in that it creates a further option for making coffee. French press coffee has a distinct taste over other kinds of coffee, because the ground coffee is fully immersed in the water and has a longer time to provides its aromas to the water. The low speed of rotation obviously should be low enough to keep most of the water inside the brewing chamber during the stirring stage. The rotation at low speed can also be described as a rocking movement.

U.S. Pat. No. 4,074,621 discloses a coffee brewing apparatus configured to brew coffee with the centrifugal effect. Column 8, lines 41-49 of this document disclose that the speed can be varied. However, the speed variations relate to a different expulsion rate and therefore to a different rate of centrifuging the coffee. This document does not disclose anything connected to mimicking a French press, in other words the document does not disclose anything related to rotating the brewing chamber in a speed which is low enough not to expel water from the brewing chamber but rather to keep the water inside the brewing chamber and mix it with the ground coffee.

U.S. Pat. No. 4,074,621 also does not disclose anything in connection with operating the device in two separate speeds in two consecutive time periods, a first time period for stirring at a low speed and a subsequent time period for centrifuging at a high speed. The device of U.S. Pat. No. 4,074,621 therefore is not capable of mimicking the French press.

U.S. Pat. No. 4,074,621 further relates to an eccentric centrifugal brewer, which is a very complex and cumbersome machine and very different from the present invention.

The second invention may be implemented in the device according to the first invention but may also be implemented in the device according to EP1876934B1.

In an embodiment, the control unit is configured for rotating the spinning assembly at a low speed in a first direction during a first time period, followed by rotating the spinning assembly at a low speed in a second, opposite direction during a second time period.

In an embodiment, the control unit is configured for rotating the spinning assembly 1-30 revolutions in the first direction, followed by rotating the spinning assembly 1-30 revolutions in the second, opposite direction.

In an embodiment, the control unit is configured for repeating the reversal of the rotation a number of times.

In an embodiment, the spinning assembly comprises one or more stirring protrusions which extend into the brewing chamber and which perform the stirring action of the coffee and hot water.

In an embodiment, the protrusions extend parallel to the main axis and through the brewing chamber.

In an embodiment, the protrusions are columns which extend between a bottom wall of the piston element and a top wall part of the piston element, and interconnect the bottom wall and the top wall part.

The second invention further relates to a method of brewing coffee, the method comprising:

filling the brewing chamber of the device according to the second invention with a quantity of ground coffee and a quantity of hot water, stirring the water and the coffee in the brewing chamber by rotating the spinning assembly at a low spinning speed during a first time period, spinning the spinning assembly at a high speed, wherein a centrifugal force is created, wherein the centrifugal force holds the ground coffee against the peripheral wall and drives the hot water through the ground coffee and through the filter.

The method provides the same advantages as the device according to the second invention.

In an embodiment of the method, the stirring step comprises stirring the water and the coffee in the brewing chamber by rotating the spinning assembly at a low spinning in a first speed direction during a first time period, followed by rotating the spinning assembly at a low speed in the opposite direction during a second time period.

In an embodiment of the method, these steps are repeated.

The control unit may be configured for receiving instructions from the user for varying the number of revolutions and the time period for stirring.

These and other aspects of the invention will be more readily appreciated as the same becomes better understood by reference to the following detailed description and considered in connection with the accompanying drawings in which like reference symbols designate like parts.

DETAILED DESCRIPTION OF THE INVENTION

Figure 1:
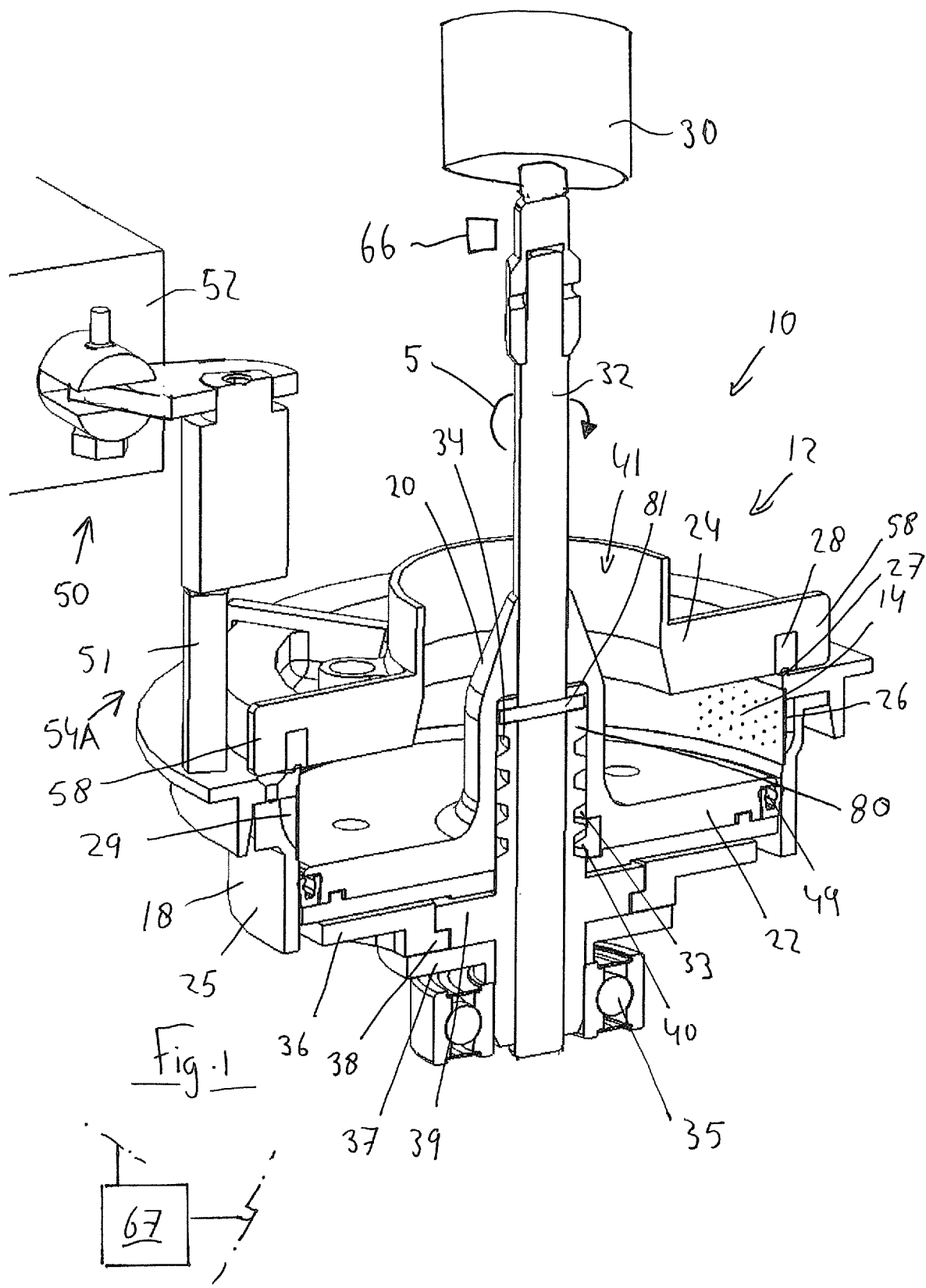
FIG. 1 shows a cross section in isometric view of an embodiment of the invention in a brewing stage.
Figure 2:
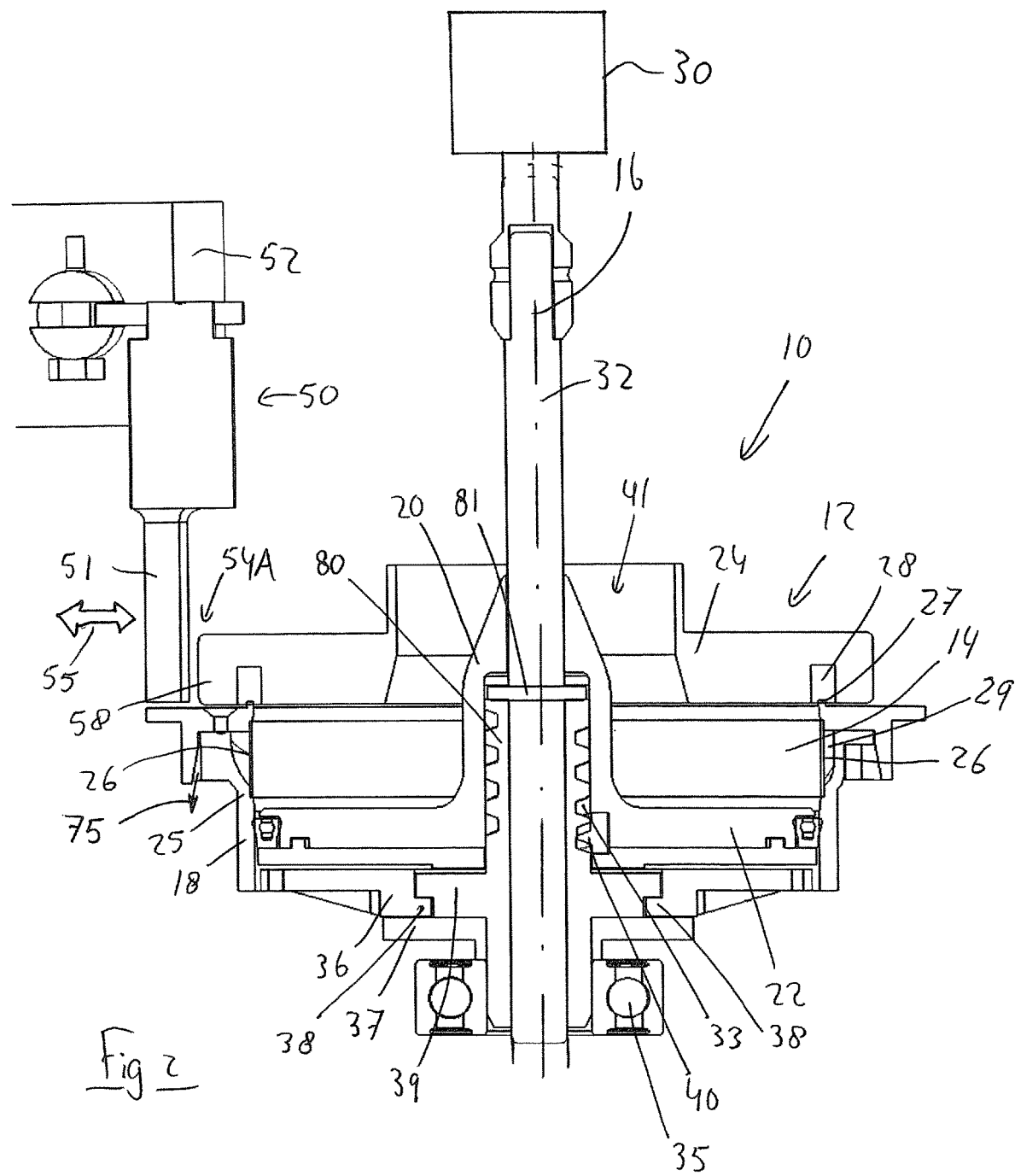
FIG. 2 shows a cross section in side view of the embodiment of FIG. 1.
Figure 3:
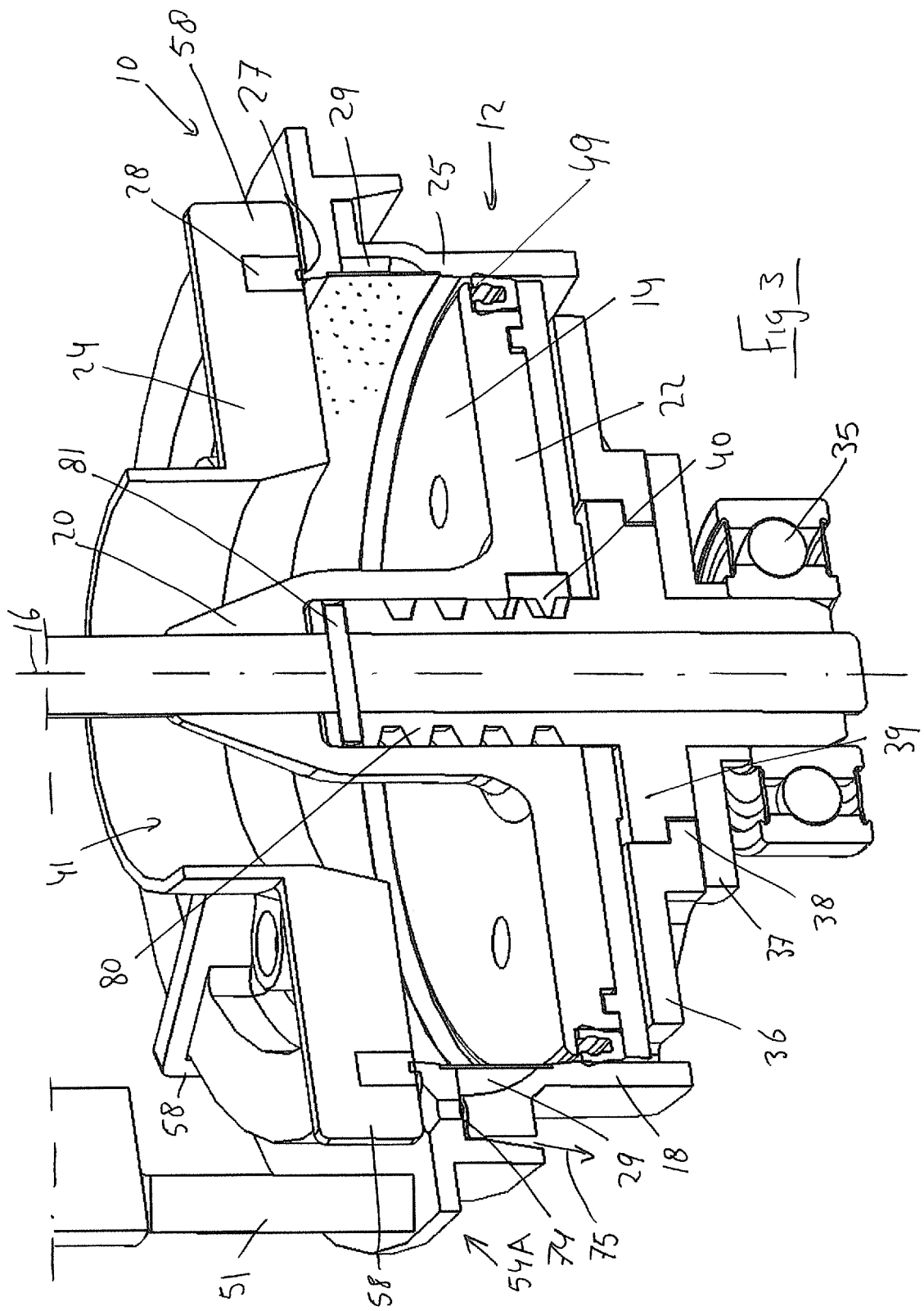
FIG. 3 shows a close-up cross section in isometric view of the embodiment of FIG. 1.

Turning to FIGS. 1, 2 and 3, the centrifugal device 10 for brewing coffee is shown. The centrifugal device 10 is similar to the device of EP1876934B1 in many aspects. The basic concept is to make coffee by centrifugal action.

The device comprising a spinning assembly 12 which defines a brewing chamber 14 into which ground coffee and hot water are supplied. The brewing chamber has an annular shape. The coffee will generally be supplied before the hot water. The spinning assembly is constructed to rotate about a central axis 16 (see FIG. 2), which will generally be vertical.

The spinning assembly comprising a cylinder element 18 and a piston element 20 which are movable relative to one another. The piston element 20 comprises a bottom wall 22 and a top wall part 24. An annular wiping member 49 is provided along the outer rim of the bottom wall 22 for wiping the used coffee from the peripheral wall 25, as will be explained below. The wiping member can be made from a resilient material. The top wall part 24 forms a roof.

The cylinder element 18 comprising a peripheral wall 25 which comprises a filter 26. Downstream of the filter, a relatively small downstream chamber 29 is provided. There are three filter screen 26 and three downstream chambers 29 positioned around the circumference of the brewing chamber. Each downstream chamber goes over in a small discharge opening 74, the construction of which is the subject of EP1876934B1. The discharge opening 74 is diagrammatically indicated in FIG. 3. The discharge opening is very small and acts as a throttling passage to maintain pressure in the downstream chamber 29.

The cylinder element comprises an upper rim 27 which is annular. The top wall part 24 comprises a complementary annular sealing ring 28 which is configured to engage the upper rim 27 and to form a sealing closure.

In top view, the cylinder element, the piston element and the brewing chamber have a general circular shape. The piston element and the brewing chamber are coaxial with the central axis, as is clear from the figures.

The cylinder element 18 and the piston element 20 define the brewing chamber 14. More in particular, the peripheral wall 25 and the bottom wall 22 define the brewing chamber.

The top wall part 24 has an opening 41 via which the ground coffee and the hot water may enter the brewing chamber.

The centrifugal device comprises a motor 30, schematically indicated in FIGS. 1 and 2, and a spindle 32 connected to the motor. The spindle is coaxial with the central axis 16. The motor 30 may be coaxial with the main axis, but may also be arranged in an eccentric position and drive the spindle via a transmission.

The spindle comprising a helical cam track 33. The helical cam track 33 is formed in a cam track part 80 which is secured in a fixed manner to the spindle 32 via a locking disc or pin 81. The cam track part 80 is treated in this document a forming a part of the spindle 33. The helical cam track has about 4 revolutions about the main axis 14. The helical cam track has an upper end 34, also referred to as an ejection end. The spindle is mounted on a bearing 35. The bearing 35 is mounted to a housing of the centrifugal device.

The spindle, the cylinder part and the piston element are movable relative to one another. The cylinder element is rotatable relative to the spindle. The cylinder element 18 comprises a lower sleeve 36 which can rotate about the spindle 32 in a sliding manner. An end plate 37, a protrusion on the spindle 32 and a notch 38 on the lower sleeve 36 ensure that the cylinder element 18 does not move in an axial direction. The cylinder element may be rotatable relative to the piston element.

The piston element 20 is configured to rotate and to make an axial movement. The piston element 20 comprises a nut 40 which runs along the helical cam track 33.

FIGS. 1, 2 and 3 show the piston element in a brewing position. In the brewing stage, the spindle is rotated at a high speed in a clockwise direction (indicated with arrow 5 in FIG. 1), when seen in top view. During the brewing stage the piston element is in the coffee brewing position which is a lower position. During the centrifugal spinning of the spinning element, the top wall part 24 of the piston element is pressed against the upper rim 27 of the cylinder element by the helical cam track 33 which acts on the nut 40. The centrifugal spinning takes place in a clockwise direction when seen from above.

This causes the cylinder element 18 to be rotated together with the piston element 20. The cylinder element therefore is driven by the piston element, and these two elements are spinned together. A centrifugal force is created which forms a bed of ground coffee against the peripheral wall 25. The centrifugal force drives the hot water through the bed of ground coffee and through the filter 26, into the downstream chamber 29 and through the discharge opening. The prepared coffee exits the centrifugal device at 75, indicated in FIG. 2.

The centrifugal device 10 further comprises a stopping device 50 comprising an engagement member 51 and an actuator 52. The engagement member 51 is a rod which extends vertically. The engagement member extends downwards from the actuator. The engagement member 51 is connected to the actuator via a pivoting arm 53.

The engagement member 51 is movable by the actuator between an engaged position and a disengaged position. FIGS. 1, 2 and 3 show the disengaged position 54. The engaged position is explained further below. The engagement member is moved in a horizontal direction 55 between the engaged position and the disengaged position.

The actuator 52 is separate from the motor 30 and independently operable from the motor. The actuator 52 is positioned above the brewing chamber. It is preferred to position the motor 30 above the brewing chamber 14.

The piston element 20 comprises six protrusions 58 which protrude over a horizontal distance from the top wall part 24. A different number is also possible.

Figure 4:
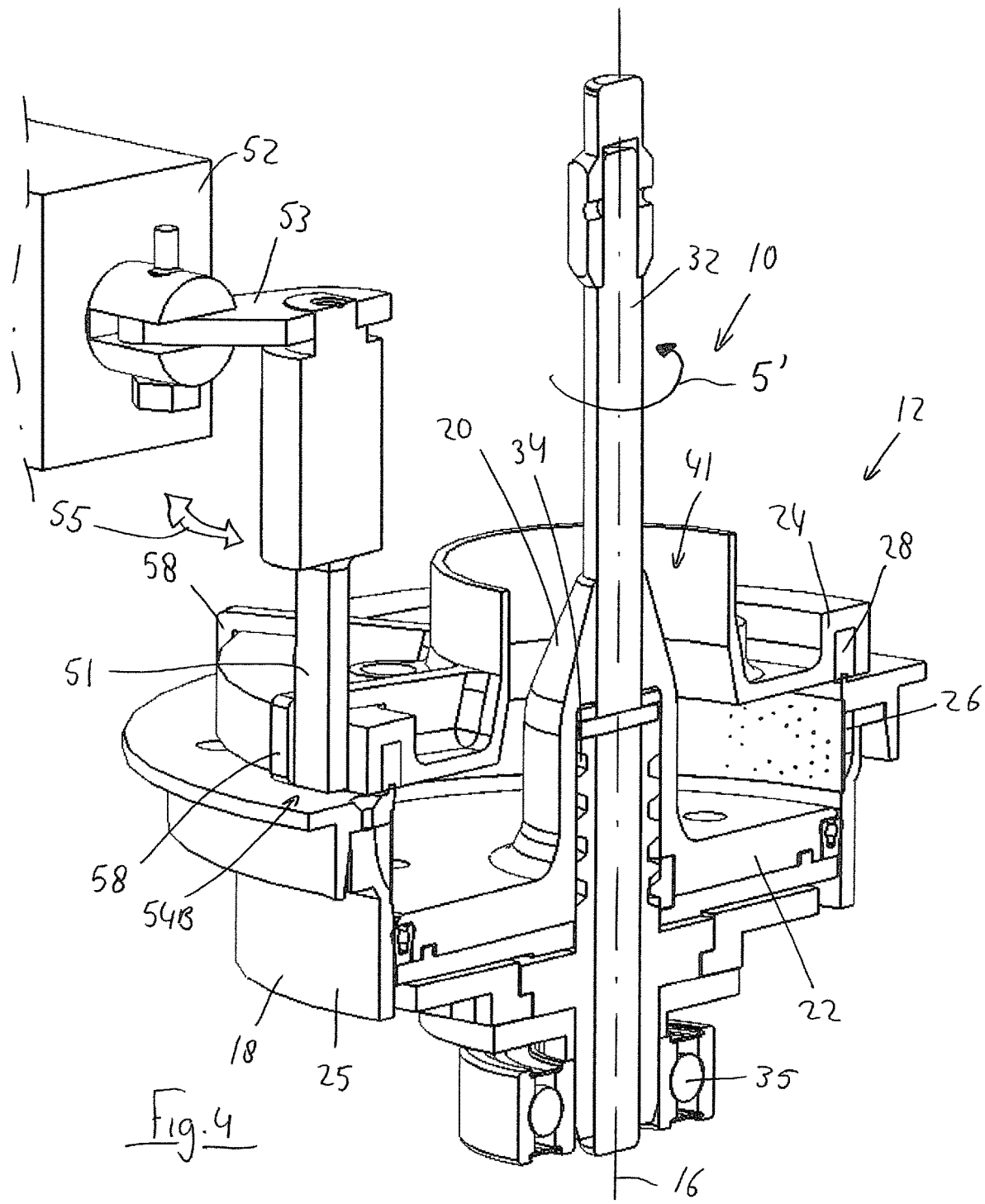
FIG. 4 shows a cross section in isometric view of an embodiment of the invention in a further step of the brewing process.
Figure 5:
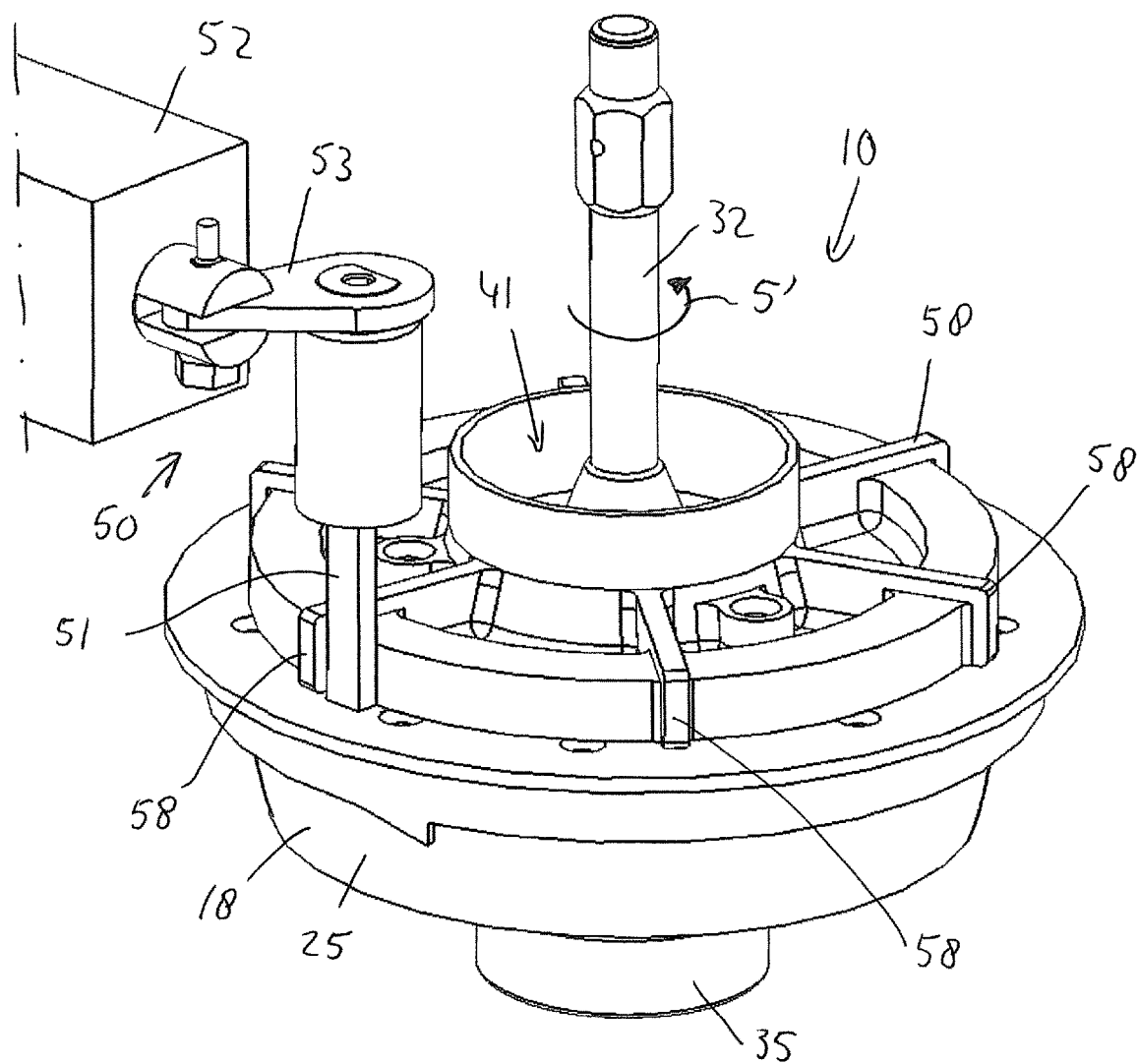
FIG. 5 shows an isometric view of an embodiment of the invention in the further step of the coffee brewing process.
Figure 6:
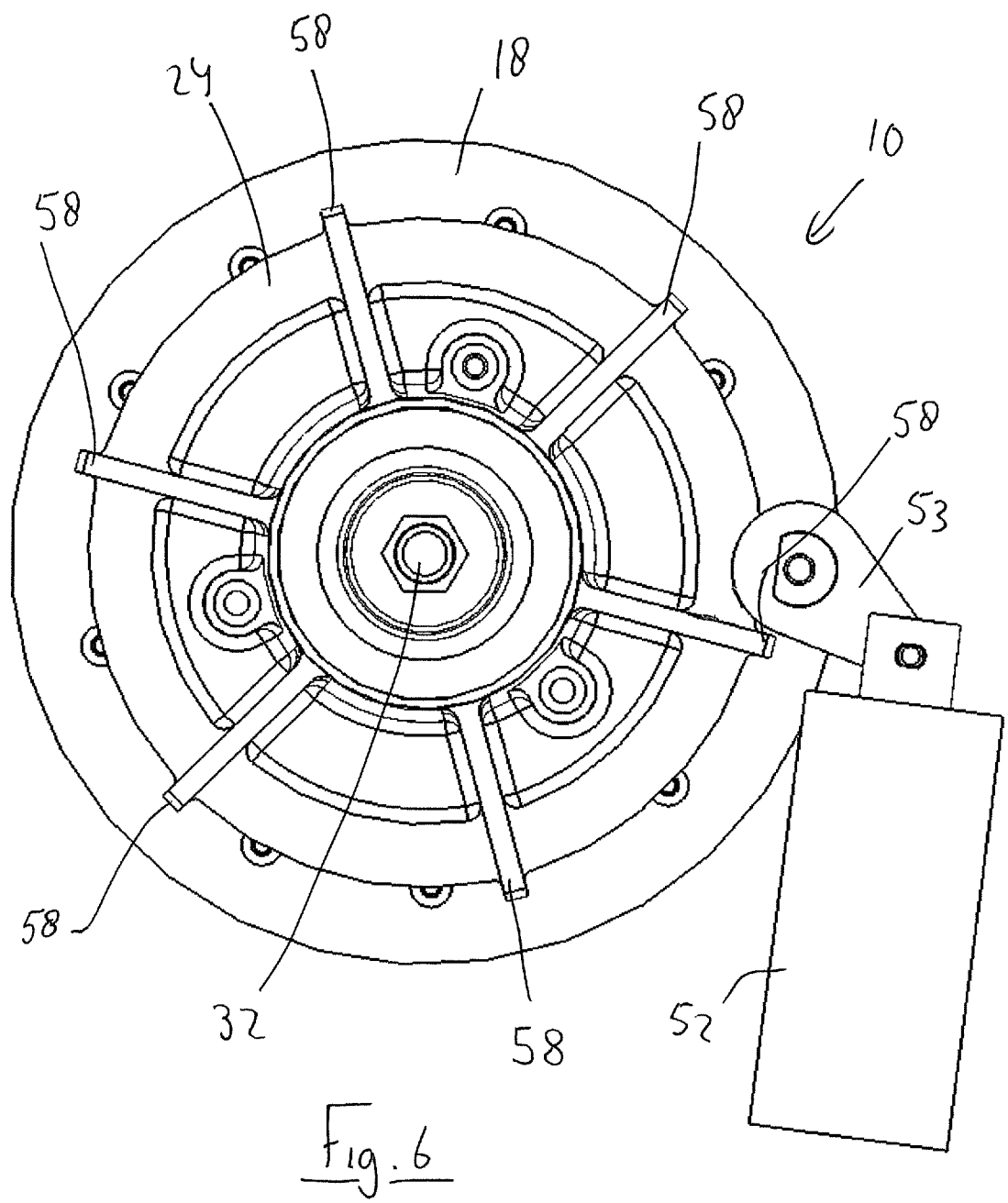
FIG. 6 shows a top view of an embodiment of the invention in the step of FIG. 5.

Turning to FIGS. 4, 5 and 6, the engagement member 51 has been moved into engaged position 54B. The engagement member 51 is now in the path of the protrusions 58. The engaging member engages one of the protrusions 58 and prevents the piston element from rotating. The motor is now reversed to a counter clockwise direction, indicated by arrow 5' in FIG. 4. When the spindle is rotated in the reverse direction, the blocking action of the engaging member causes the nut to travel upward along the helical cam track of the spindle and causes the piston element to move upward relative to the cylinder element. The sealing ring of the piston element disengages from the upper rim 27 and moves upward from the coffee brewing position to the coffee ejecting position. The cylinder element is free to rotate relative to the spindle and as a result does not rotate together with the spindle when the piston element moves upward. The cylinder element will also not rotate because of the friction between the wiper member 49 and the cylinder element.

Figure 7:
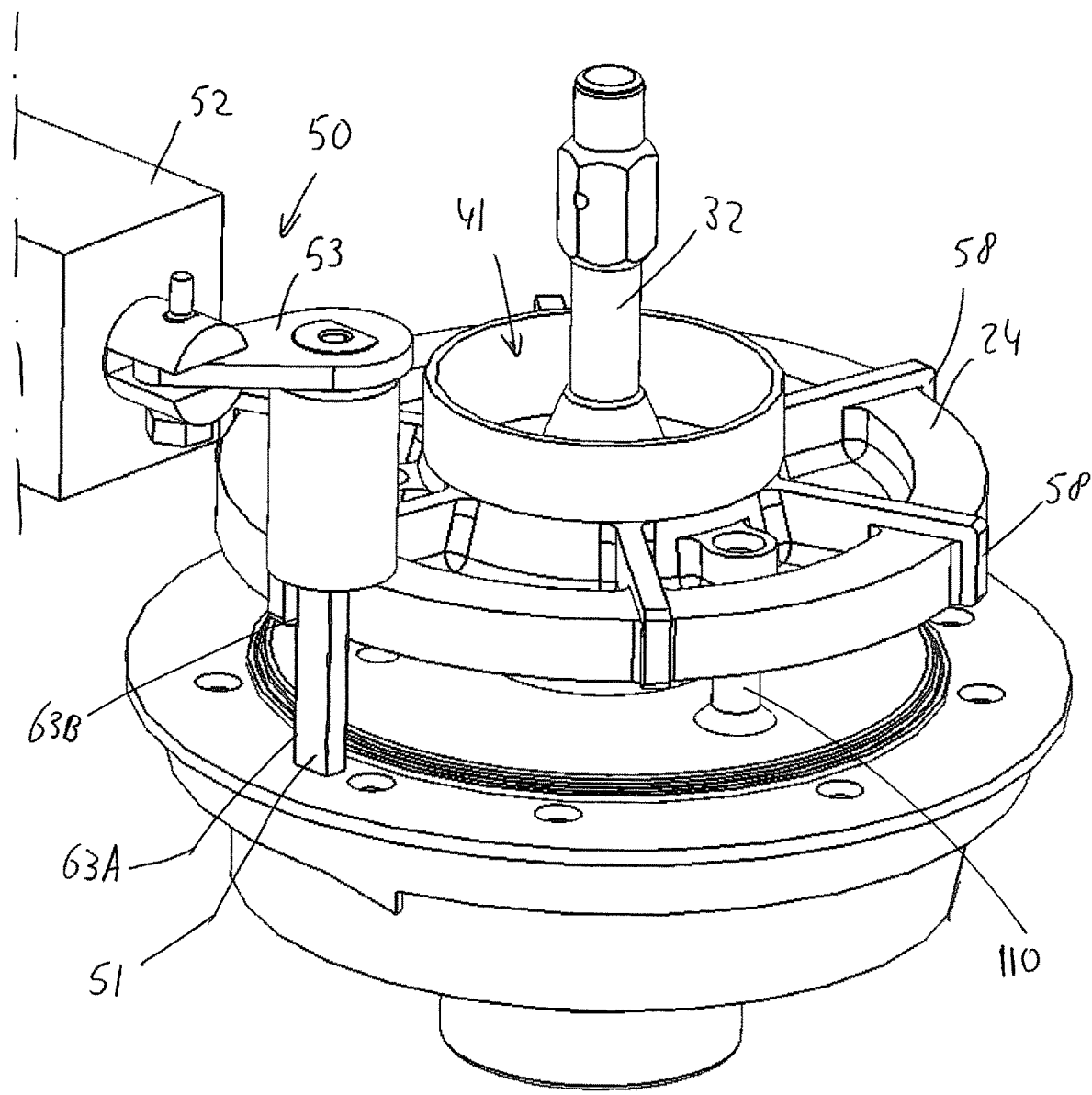
FIG. 7 shows an isometric view of an embodiment of the invention in yet a further step of the coffee brewing process.
Figure 8:
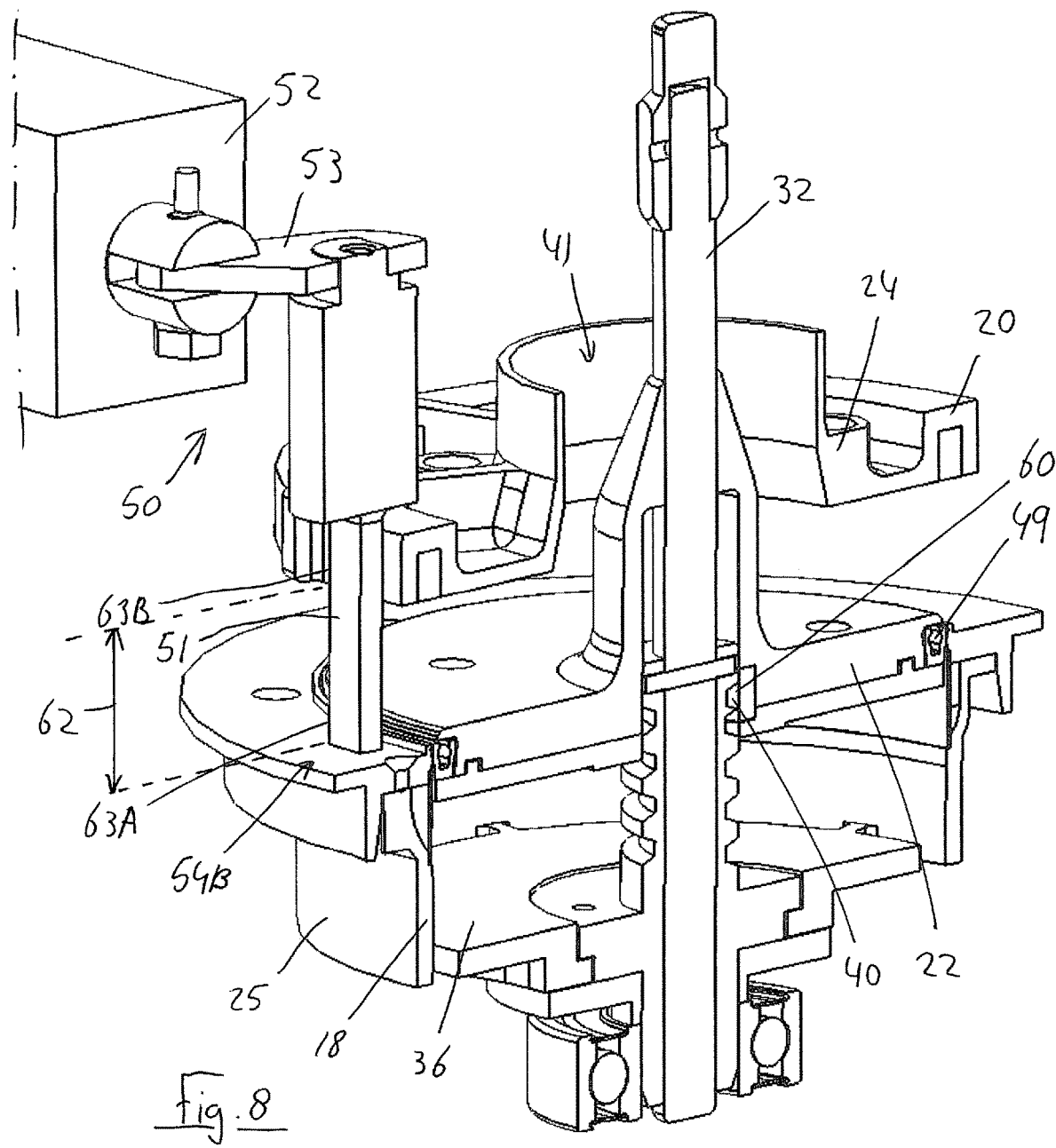
FIG. 8 shows a cross section in isometric view of an embodiment of the invention in the step of FIG. 7.

Turning to FIGS. 7 and 8, the piston element is shown in the coffee ejecting position. The bottom wall 22 of the piston element is raised to slightly above the level of the upper rim 27. The used coffee has been wiped from the peripheral wall 25 by the wiping member 49 and lies on the bottom wall.

The nut 40 is located at an upper end of the helical cam track and is stopped by the upper end. The upper end is referred to as the ejection end 60.

The engagement member is still in the engaged position 54B. The protrusion 58 has made a sliding movement from the lower position to the upper position along the engagement member 51. It will be clear that the protrusion 58 now engages a different, higher part of the engagement member 51.

The engagement member 51 extends over a vertical distance 62 which is at least equal to a distance between the coffee brewing position and the coffee ejecting position of the piston element. The engagement member 51 comprises a first engagement area 63A and a second engagement area 63B which are spaced apart. The engagement member 51 contacts the protrusion 58 of the piston element with the first engagement area 63A when it is in the coffee brewing position and with the second engagement area 63B when it is in the coffee ejecting position.

FIG. 7 also shows columns 110 which interconnect the bottom wall 22 and the top wall part 24.

Figure 9:
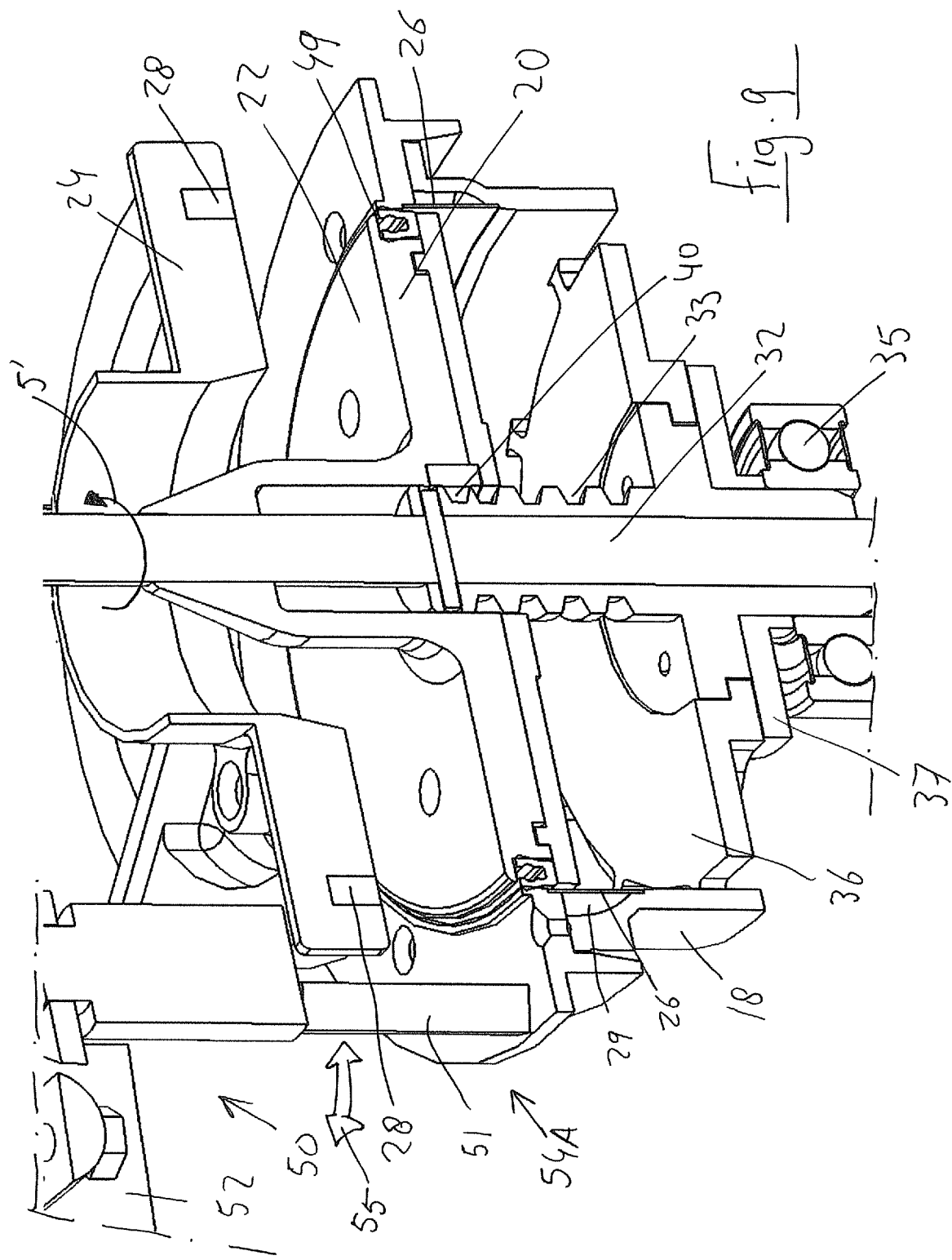
FIG. 9 shows a close-up of a cross section in isometric view of an embodiment of the invention in yet a further step of the coffee brewing process.

Turning to FIG. 9, the engagement member 51 is moved back to the disengaged position 54A. Next, the coffee ejection stage starts. The spindle 32 is rotated at a high speed by the motor 30 in the counter clockwise direction (when seen from above), and the used coffee is ejected sideways as a result of the centrifugal force. The used coffee drops into a tray for the used coffee.

During the centrifugal rotation, the piston element is driven by the ejecting end 39 of the helical cam track which acts on the nut 40. The cylinder element 18 is stationary during the ejection stage, because it is not driven by anything.

It will be understood that the engagement member is configured to engage the piston element both in the coffee brewing position and in the coffee ejecting position of the piston element and is also configured to disengage the piston element both in the coffee brewing position and in the coffee ejecting position.

Therefore, four operating situations can be distinguished:
an engaged position when the piston element is in the coffee brewing position,
a disengaged position when the piston element is in the coffee brewing position,
an engaged position when the piston element is in the coffee ejecting position, and
a disengaged position when the piston element is in the coffee ejecting position.

At the end of the ejection stage, the engagement member 51 is again engaged with a protrusions 58 of the piston element 20. The motor is again reversed to a clockwise direction. The engagement member 51 nog engages an opposite side of the protrusion 58 and prevents the piston element from rotating. The piston element travels downward again, back to the coffee brewing position. During the downward travel, the nut 40 follows the helical cam track which rotates. When the top wall part 24 of the piston element 20 engages the upper rim, the piston element is back in the coffee brewing position.

The motor 30 can be stopped and the centrifugal device is ready for making another cup of coffee. It is noted that the centrifugal device according to the invention can make small cups and large cups of coffee of various types. The centrifugal device can even make pots of coffee by continuing to supply hot water into the brewing chamber during the centrifugal movement in the coffee brewing stage.

Returning to FIG. 1, the centrifugal device 10 may comprise a revolution sensor 66 which is coupled to the motor 30 or to the spindle 32. The revolution sensor is configured to record the revolutions of the motor or spindle. The centrifugal device further comprises a control unit 67 which is coupled to the sensor 66 and coupled to the stopping device 50. The control unit is configured to count a number of revolutions of the spindle 32 from a moment in which the engagement member 51 engages the piston element 20 in the coffee brewing position. The control unit 67 sends a disengagement signal to the stopping device 50 for disengaging the engagement member 51 from the piston element 20 after a predetermined number of revolutions of the motor or spindle. This predetermined number of revolutions determines when the piston element reaches the coffee ejecting position.

When the piston element travels back from the coffee ejecting position to the coffee brewing position, it is more difficult to determine the moment at which the piston element reaches the coffee brewing position on the basis of the number of revolutions. This is due to the fact that the sealing ring 28 is resilient. When the piston element reaches the coffee brewing position and re-engages the upper rim of the cylinder element, the spindle is blocked from further rotation by the nut 40 and stops. The same sensor 66 may be configured to register that the spindle has stopped rotating. The control unit may be configured to determine on the basis of the stopped rotation of the spindle that the coffee brewing position has been reached and send a disengagement signal to the stopping device for disengaging the engagement member 51 from the piston element.

Figure 10:
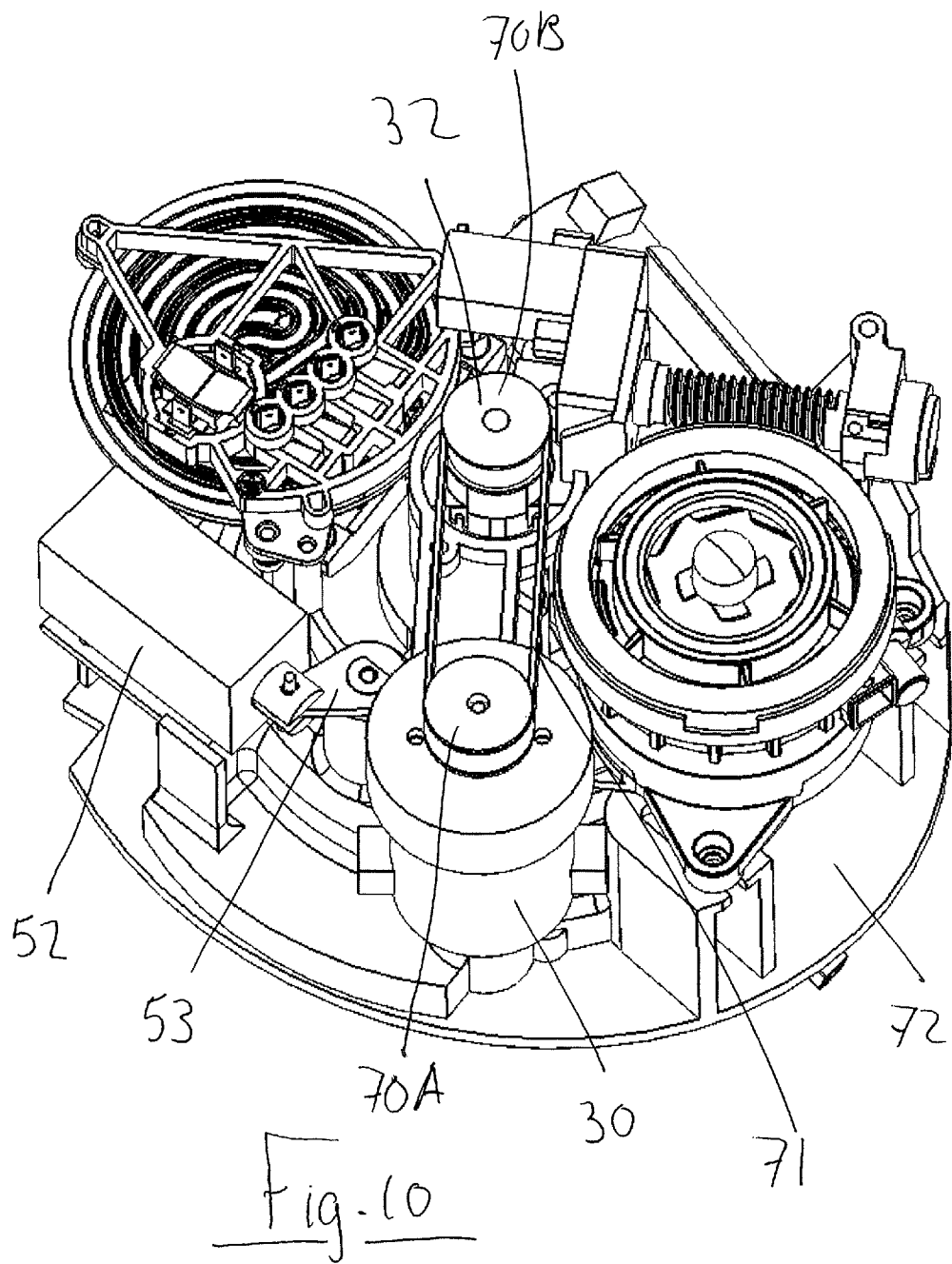
FIG. 10 shows an isometric view of the arrangement of the motor and stopping device on the centrifugal device.
Figures 11A, 11B, 11C, 11D:
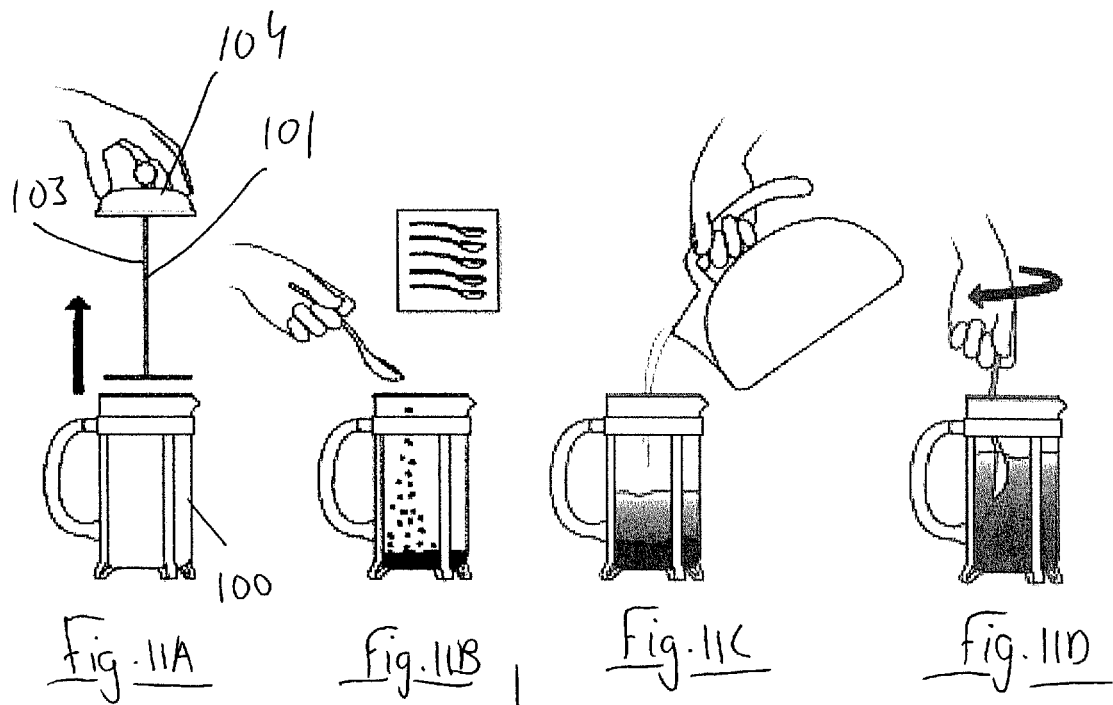
FIGS. 11A, 11B, 11C and 11D show a classis method of making French press coffee.

Turning to FIG. 10, a top part of the centrifugal device is shown which is located above the spinning assembly 12. The motor 30 and the actuator 52 of the stopping device 50 are shown. The motor is positioned eccentric and is connected to the spindle 32 via two pulleys 70A, 70B and a drive belt 71. The parts are mounted on a partition plate 72 which separates the motor and actuator from the spinning assembly 12. The partition plate is mounted to the housing of the centrifugal device.

The present invention relates to a method of brewing coffee, the method comprising:
providing the centrifugal device 10 according to the invention,
supplying ground coffee and hot water into the brewing chamber,
spinning the spinning assembly 12 at a high rotational speed in a brewing stage, wherein a centrifugal force is created, wherein the centrifugal force forms a bed of coffee against the peripheral wall and drives the hot water through the coffee and through the filter,
after the coffee has been prepared:
stopping the motor 30 and engaging the engagement member 51 against the piston element 20, rotating the spindle 32 in the opposite direction, thereby forcing the piston element 20 to move along the helical cam track 33 relative to the cylinder part 18 from the coffee brewing position to the coffee ejecting position while wiping the used coffee from the peripheral wall 25, after the piston element has reached the coffee ejecting position, disengaging the engagement member 51 from the piston element and spinning the piston element at a high rotational speed in an ejection stage, thereby ejecting the coffee sideways from the piston element by centrifugal force, after the coffee had been ejected, re-engaging the engagement member 51 against the spinning assembly 12 and again reversing the direction of rotation of the spindle, thereby forcing the piston element to return along the helical cam track from the coffee ejecting position to the coffee brewing position until the top wall part engages the upper rim 27 of the cylinder element and the piston element has returned to the coffee brewing position, after the piston element has reached the coffee brewing position, disengaging the engagement member from the spinning assembly.

In operation, the spinning assembly 12 is rotated at a high speed during the brewing stage and the ejection stage, for instance 2000-10000 rpm. The piston element is rotated at a relatively low speed during the movement of the piston element between the coffee brewing position and the coffee ejecting position.

Second Invention

Turning to FIGS. 11A-11D, the traditional method of making French press coffee is shown. A pot (or beaker) 100 is provided and a plunger 101 comprising a horizontal filter element 102, a vertical rod 103 and a hand grip 104 is also provided. Coffee power is supplied into the pot. Next, hot water is supplied into the pot, see FIG. 11C. Next, the coffee and water is stirred with a stirring element 105 which can be spoon, see FIG. 11D.

Next, the plunger 101 is pressed downward into the pot. The filter element takes the ground coffee with it on its path downward. The coffee is then ready to be served.

A second invention relates to making French press coffee with the centrifugal device 10. The second invention can be carried out with the same centrifugal device as disclosed with respect to the first invention.

As discussed above, the centrifugal device 10 for brewing coffee comprises a spinning assembly 12 which defines a brewing chamber 14 into which ground coffee and hot water are supplied. The spinning assembly 12 is constructed to rotate about a central axis 16.

The spinning assembly comprises a piston element 20 comprising a bottom wall 22 which forms a bottom of the brewing chamber 14 and a cylinder element 18 comprising a peripheral wall 25 which comprises a filter 26 via which the brewed coffee exits the brewing chamber 14.

The centrifugal device comprises a motor 30 constructed for spinning the spinning assembly in a brewing stage in order to create a centrifugal force which drives hot water through a bed of ground coffee and through the filter.

The centrifugal device comprises a control unit 67 for controlling the motor. The control unit is configured to fill the brewing chamber 14 with ground coffee and hot water. The brewing chamber 14 is coaxial with the central axis 16.

In a next step which is carried out prior to the brewing stage, the motor rotates the spinning assembly which contains the ground coffee and the hot water at a low speed in a stirring stage. Inn this stirring stage the mixture of ground coffee and hot water in the brewing chamber is stirred at the low speed. This can be compared to the situation shown in FIG. 11C which relates to the manual method of making French press.

The low speed may for instance be 30-100 rpm. The control unit may be configured for rotating the spinning assembly 12 at a low speed in a first direction during a first time period T1, followed by rotating the spinning assembly at a low speed in a second, opposite direction during a second time period T2. The first time period may be 1-10 seconds and the second time period may also be 1-10 seconds.

It will be understood that this rotational movement is performed at such a low speed that there is substantially no centrifugal effect. Therefore, the water is not driven sideways through the filter 26

The control unit may be configured for rotating the spinning assembly over 1-30 revolutions in the first direction, followed by rotating the spinning assembly 1-30 revolutions in the second, opposite direction. However, the exact number may vary.

These steps may be repeated a number of times in order to achieve good mixing of the ground coffee and the hot water and to ensure that the coffee aromas are extracted.

Figure 12:
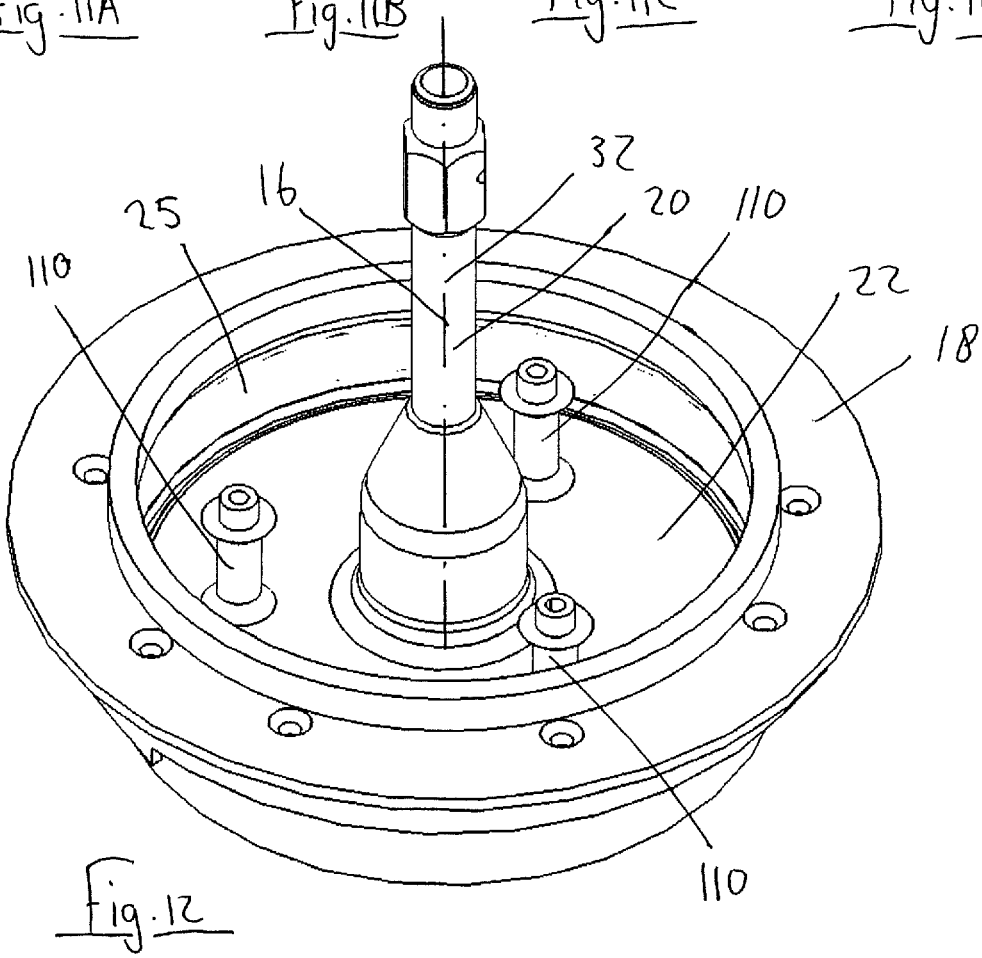
FIG. 12 shows an isometric view of a spinning assembly for making French press coffee.
Figure 13:
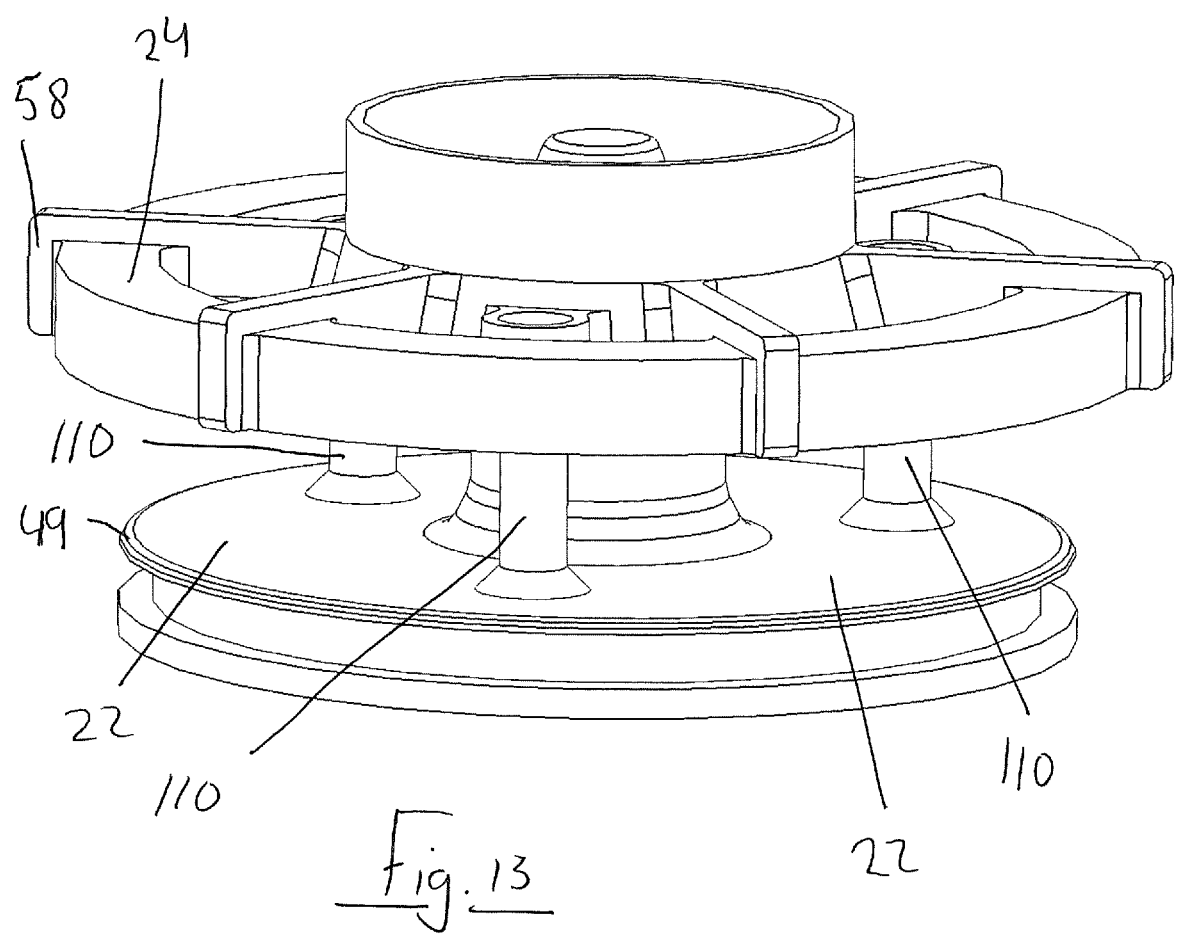
FIG. 13 shows another isometric view of a spinning assembly for making French press coffee.
Figure 14:
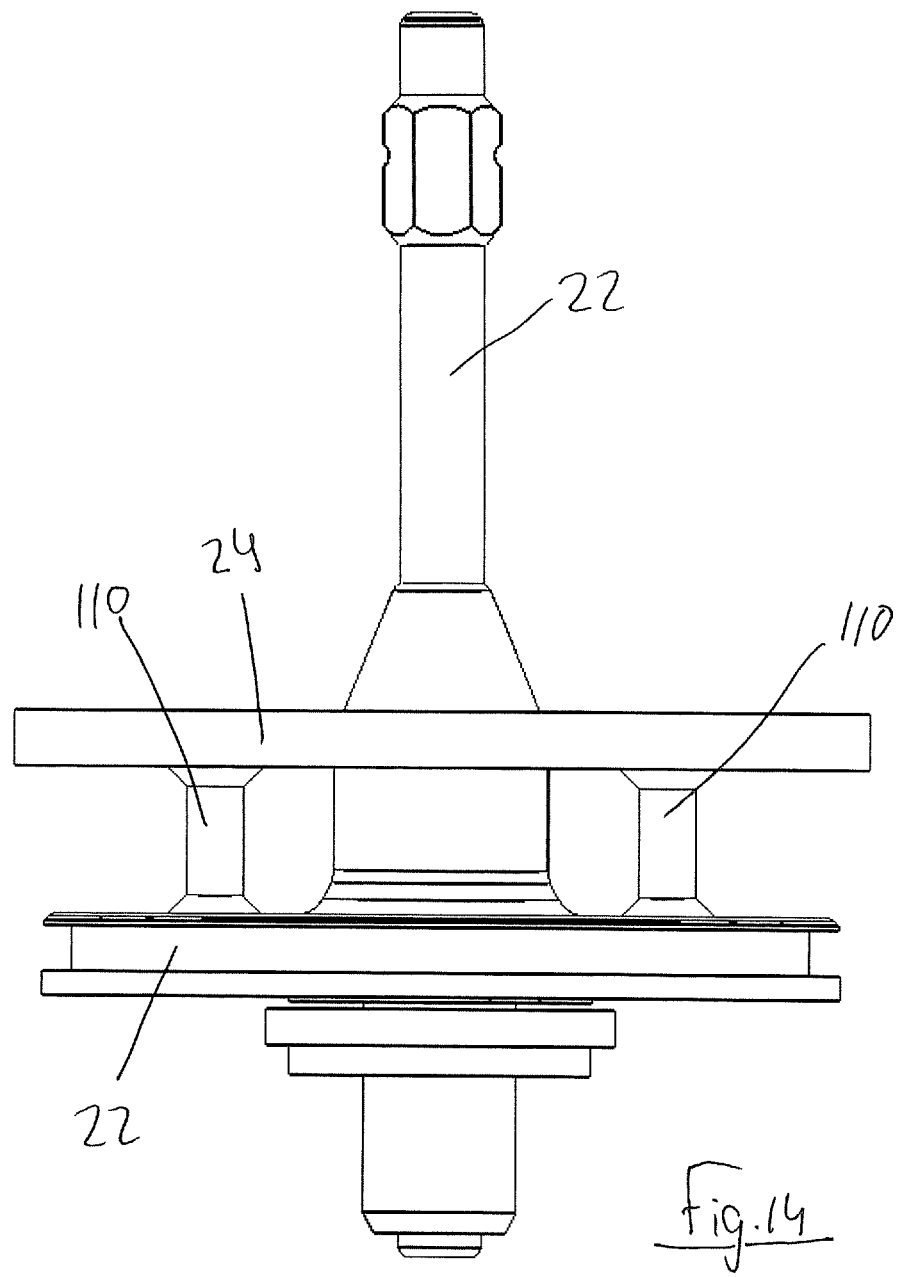
FIG. 14 shows a side view of a spinning assembly for making French press coffee.

Turning to FIGS. 12, 13 and 14, the spinning assembly 12 of the centrifugal device 10 comprises one or more stirring protrusions 110 which extend into the brewing chamber and which perform the stirring action of the coffee and hot water.

The stirring protrusions 110 may extend parallel to the main axis 16 and through the brewing chamber. In this embodiment, the protrusions are columns which extend between a bottom wall 22 of the piston element and a top wall part 24 of the piston element. The columns interconnect the bottom wall and the top wall part.

The second invention further relates to a method of brewing coffee, the method comprising:
  providing the device according to the invention,
  filling the brewing chamber 14 with a quantity of ground coffee and a quantity of hot water,
  stirring the water and the coffee in the brewing chamber by rotating the spinning assembly 12 at a low spinning speed during a first time period,
  spinning the spinning assembly 12 at a high speed, wherein a centrifugal force is created, wherein the centrifugal force holds the ground coffee against the peripheral wall and drives the hot water through the ground coffee and through the filter.

The stirring step may comprise stirring the water and the coffee in the brewing chamber by rotating the spinning assembly at a low spinning in a first speed direction during a first time period, followed by rotating the spinning assembly at a low speed in the opposite direction during a second time period. These steps may be repeated.

Figure 15:
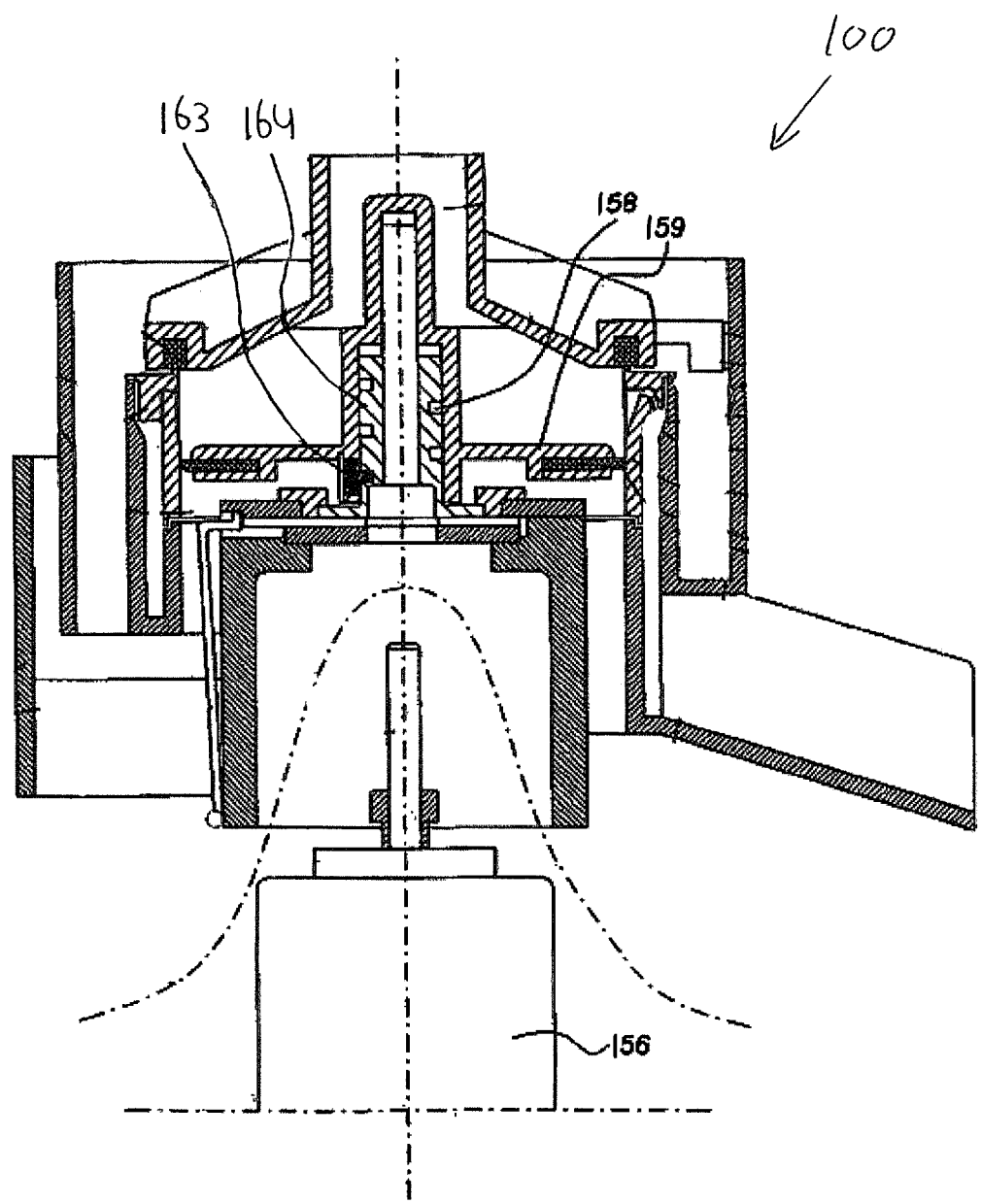
FIG. 15 shows a side view of a centrifugal device for brewing coffee according to the prior art.

Turning to FIG. 15, a centrifugal device 100 for brewing coffee according to the prior art EP1876934B1 is disclosed. The device comprises a screw spindle 164 having a groove 158. The spindle is driven by motor 156. The device further comprises a piston element 159 which comprises a nut 163.

After the centrifuging of the coffee has completed, the waste material of the coffee has to be removed from the chamber. To this end, the motor 156 and the spindle 164 make an abrupt stop. The piston element 159, as a result of its inertia, will continue to rotate and make a helical upward movement along the groove 158. During its upward movement, it will wipe the coffee from the filter screen. When the piston element 159 is in the upper position, the motor and the spindle 164 will start to spin in the opposite direction and the coffee is ejected sideways from the bottom plate of the piston element.

After the ejection of the coffee, the motor and the spindle 164 are reversed abruptly again, and the piston element will return back to the lower position due to its own inertia by a reverse helical movement along the groove 158.

In an embodiment, the second invention relates to a centrifugal device 10 for brewing coffee, comprising:
- a spinning assembly 12 which defines a brewing chamber 14 into which ground coffee and hot water are supplied, the spinning assembly being constructed to rotate about a central axis 16, the spinning assembly comprising:
  - a piston element 20 comprising a bottom wall 22 which forms a bottom of the brewing chamber 14 and
  - a cylinder element 18 comprising a peripheral wall (26) which comprises a filter via which the brewed coffee exits the chamber,
- a motor 30 constructed for spinning the spinning assembly in a brewing stage in order to create a centrifugal force which drives hot water through a bed of ground coffee and through the filter,
- a control unit 67 for controlling the motor, wherein the control unit is configured to:
  - fill the brewing chamber with ground coffee and hot water, and
  - prior to the brewing stage, let the motor rotate the spinning assembly which contains ground coffee and hot water at a low speed in a stirring stage, thereby stirring the mixture of ground coffee and hot water in the brewing chamber at the low speed.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

More specifically, it will be recognized by the skilled person that the coffee ejection position may also be located below the coffee brewing position. In this arrangement, the used coffee is wiped downward from the peripheral wall by the piston element.

Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The invention claimed is:

1. A centrifugal device for brewing coffee, comprising:
  - a spinning assembly which defines a brewing chamber into which ground coffee and hot water are supplied, the spinning assembly being constructed to rotate about a central axis, the spinning assembly comprising:
    - a piston element comprising a bottom wall and a top wall part,
    - a cylinder element comprising a peripheral wall which comprises a filter, wherein the cylinder element comprises an upper rim, and wherein the top wall part of the piston element is configured to engage the upper rim, wherein the peripheral wall and the bottom wall define the brewing chamber,
  - a motor and a spindle connected to the motor, the spindle being coaxial with the central axis and comprising a helical cam track,
  - wherein the piston element comprises a nut which runs along the helical cam track, wherein during a centrifugal rotation the piston element is in a coffee brewing position in which the top wall part of the piston element is pressed against the upper rim of the cylinder element by the helical cam track which acts on the nut, and wherein during said centrifugal rotation the piston element is rotated by the spindle via the action on the nut and is pressed against the upper rim, causing the cylinder element to be rotated together with the piston element, wherein a centrifugal force is created which forms a bed of coffee against the peripheral wall and which drives the hot water through the bed of coffee and through the filter,
  - wherein the cylinder element is rotatable relative to the spindle when the piston element is not in the brewing position,
  - wherein the centrifugal device further comprises a stopping device comprising:
    - an engagement member and
    - an actuator,
    - the engagement member being movable by the actuator between an engaged position and a disengaged position, wherein in the engaged position the engagement member engages the piston element and stops the centrifugal rotation of said piston element, thereby causing the nut to travel along the helical cam track of the spindle when the spindle is rotated by the motor and causing the piston element to move upward or downward relative to the cylinder element between the coffee brewing position in which the coffee is brewed and a coffee ejecting position in which used ground coffee is ejected.

2. The centrifugal device according to claim 1, wherein the engagement member is configured to engage the piston element both in the coffee brewing position and in the coffee ejecting position of the piston element and is configured to disengage the piston element both in the coffee brewing position and in the coffee ejecting position, thereby defining four operating situations:
  a) the engagement member is engaged with the piston element in the coffee brewing position,
  b) the engagement member is disengaged from the piston element in the coffee brewing position,
  c) the engagement member is engaged with the piston element in the coffee ejecting position, and
  d) the engagement member is disengaged from the piston element in the coffee ejecting position.

3. The centrifugal device according to claim 1, wherein the piston element comprises a number of protrusions which protrude from the piston element, wherein the engagement member is configured to be moved into a path of the protrusions in the engaged position for engaging the protrusions, thereby stopping the centrifugal rotation of the piston element.

4. The centrifugal device according to claim 1, wherein the engagement member is moved in a horizontal direction between the engaged position and the disengaged position.

5. The centrifugal device according to claim 1, wherein the engagement member extends over a vertical distance which is at least equal to a distance between the coffee brewing position and the coffee ejecting position of the piston element and wherein the engagement member comprises a first engagement area and a second engagement area which are spaced apart, and wherein the engagement member contacts the piston element with the first engagement area when it is in the coffee brewing position and with the second engagement area when it is in the coffee ejecting position.

6. The centrifugal device according to claim 1, wherein the actuator is separate from the motor and independently operable from the motor.

7. The centrifugal device according to claim 1, wherein the helical cam track has an ejecting end, and wherein in the coffee ejecting position the nut is located at the ejecting end of the helical cam track and is driven by the ejecting end during spinning at a speed in which the used coffee is ejected.

8. The centrifugal device according to claim 1, wherein the coffee brewing position is a lower position and the coffee ejecting position is an upper position.

9. The centrifugal device according to claim 1, wherein in the coffee ejecting position the bottom wall is located above the upper rim.

10. The centrifugal device according to claim 1, wherein the actuator of the stopping device is positioned above the brewing chamber and the motor is positioned above the brewing chamber, and wherein the engagement member extends downwards from the actuator.

11. The centrifugal device according to claim 1, comprising:
a revolution sensor coupled to the motor or to the spindle, the revolution sensor being configured to record revolutions of the motor or spindle, and
a control unit coupled to the sensor and coupled to the stopping device, the control unit being configured to:
count a first number of revolutions of the spindle from a moment in which the engagement member engages the piston element in the coffee brewing position, and to send a first disengagement signal to the stopping device for disengaging the engagement member from the piston element after a predetermined first number of revolutions of the motor or spindle, which predetermined first number of revolutions determines when the piston element reaches the coffee ejecting position, and/or count a second number of revolutions of the spindle from a moment in which the engagement member engages the piston element in the coffee ejecting position, and to send a second disengagement signal to the stopping device for disengaging the engagement member from the piston element after a predetermined second number of revolutions of the motor or spindle which predetermined second number of revolutions determines when the piston element reaches the coffee brewing position.

12. A method of brewing coffee, the method comprising:
supplying ground coffee and hot water into the brewing chamber of the centrifugal device according to claim 1, spinning the spinning assembly at a rotational speed in a brewing stage, wherein the centrifugal force forms the bed of coffee against the peripheral wall and drives the hot water through the coffee and through the filter,
after the coffee has been prepared:
stopping the motor and engaging the engagement member against the piston element,
rotating the spindle in the opposite direction, thereby forcing the piston element to move along the helical cam track relative to the cylinder element from the coffee brewing position to the coffee ejecting position while wiping the used coffee from the peripheral wall,
after the piston element has reached the coffee ejecting position, disengaging the engagement member from the piston element and spinning the piston element at a rotational speed in an ejection stage, thereby ejecting the coffee sideways from the piston element by centrifugal force,
after the coffee had been ejected, re-engaging the engagement member against the spinning assembly and again reversing the direction of rotation of the spindle, thereby forcing the piston element to return along the helical cam track from the coffee ejecting position to the coffee brewing position until the top wall part engages the upper rim of the cylinder element and the piston element has returned to the coffee brewing position,
after the piston element has reached the coffee brewing position, disengaging the engagement member from the spinning assembly.

13. The method according to claim 12, wherein the motor is rotated at a relatively high speed during the brewing stage and the ejection stage and the piston element is rotated at a relatively low speed during the movement of the piston element between the coffee brewing position and the coffee ejecting position.

14. The method according to claim 12, comprising providing a centrifugal device comprising:
a revolution sensor coupled to the motor or to the spindle, the revolution sensor being configured to record revolutions of the motor or spindle, and
a control unit coupled to the sensor and coupled to the stopping device, the control unit being configured to:
count a first number of revolutions of the spindle from a moment in which the engagement member engages the piston element in the coffee brewing position, and to send a first disengagement signal to the stopping device for disengaging the engagement member from the piston element after a predetermined first number of revolutions of the motor or spindle, which predetermined first number of revolutions determines when the piston element reaches the coffee ejecting position, and/or count a second number of revolutions of the spindle from a moment in which the engagement member engages the piston element in the coffee ejecting position, and to send a second disengagement signal to the stopping device for disengaging the engagement member from the piston element after a predetermined second number of revolutions of the motor or spindle which predetermined second number of revolutions determines when the piston element reaches the coffee brewing position,
the method further comprising:
counting the number of revolutions during a movement of the piston element between the coffee brewing position and the coffee ejecting position, and determining when the piston element has travelled the full distance between the coffee brewing position and the coffee ejecting position on the basis of the counted revolutions, and disengaging the stopping device from the piston element when the piston element has reached the coffee brewing position or the coffee ejecting position.

15. The method according to claim 12, wherein during the brewing stage the piston element is driven by the spindle which acts on the nut, the piston element being pressed against the upper rim of the cylinder element and spinning the cylinder element during the centrifugal rotation.

16. The method according to claim 12, wherein during the ejection stage the nut is located at an ejection end of the helical cam track and is driven by the spindle which acts on the nut of the piston element via the ejection end of the helical cam track.

* * * * *